United States Patent [19]
Takayama et al.

[11] Patent Number: 5,117,361
[45] Date of Patent: May 26, 1992

[54] ANTI-SKID BRAKE CONTROL APPARATUS

[76] Inventors: Toshio Takayama, 4246-5, Nishiyahata, Ryuoh-cho, Nakakoma-gun, Yamanashi-ken; Masaru Sakuma, 301, Daini Coop Hosaka, 9-12, Kugawahoncho, Kofu-shi, Yamanashi-ken; Yukou Ono, 708-32, Kamimiyaji, Kushigata-cho, Nakakoma-gun, Yamanashi-ken, all of Japan

[21] Appl. No.: 438,841

[22] Filed: Nov. 17, 1989

[30] Foreign Application Priority Data

Nov. 17, 1988 [JP] Japan .................. 63-290878
Oct. 20, 1989 [JP] Japan .................. 1-273102

[51] Int. Cl.$^5$ .................. G06F 15/50; B60T 8/82; B60T 8/74
[52] U.S. Cl. .................. 364/426.02; 303/96; 303/97; 303/103
[58] Field of Search .................. 364/426.02, 426.01, 364/426.03; 303/109, 103, 95, 96, 97, 98, 100

[56] References Cited

U.S. PATENT DOCUMENTS

| | | | |
|---|---|---|---|
| 3,827,760 | 8/1974 | Fleagle | 303/106 |
| 4,060,285 | 11/1977 | Jones | 364/426.02 X |
| 4,485,445 | 11/1984 | Braschel | 364/426.02 |
| 4,818,037 | 4/1989 | McEnnan | 303/109 X |

FOREIGN PATENT DOCUMENTS

| | | |
|---|---|---|
| 1417673 | 12/1975 | United Kingdom . |
| 2119882 | 11/1983 | United Kingdom . |
| 2151732 | 7/1985 | United Kingdom . |
| 2165013 | 4/1986 | United Kingdom . |

Primary Examiner—Parshotam S. Lall
Assistant Examiner—E. J. Pipala

[57] ABSTRACT

The present invention relates to an anti-skid brake control apparatus for a brake system of wheeled vehicles. The control apparatus according to the present invention is essentially composed of a slip speed meter, a threshold value setting device and a brake oil pressure control device. The slip speed meter calculates at least one of a slip speed and a wheel acceleration. The acceleration is a time derivative of the rotational speed of a wheel. The threshold value setting device temporarily determines a threshold value for at least one of the slip speed and the wheel acceleration with reference to at least one of the slip speed and the wheel acceleration. The brake oil pressure control device controlling braking force of the brake system with reference to at least one of a comparison of the slip speed and the threshold value thereof, and a comparison of the wheel acceleration and the threshold value thereof, whereby skidding of the wheel is prevented by temporarily controlling the braking force.

10 Claims, 5 Drawing Sheets

FIG.8d
BRAKE OIL
PRESSURE

ANTI-SKID BRAKE CONTROL APPARATUS

BACKGROUND OF THE INVENTION

1. Field of the Invention

The field of the present invention relates to the braking systems of wheeled vehicles. More precisely, the present anti-skid brake control apparatus is applicable, though the application is not limited thereto, to brake systems for suppressing vehicle skid which might occur at an abrupt braking.

2. Prior Art

When a wheeled vehicle is to be stopped in a short distance, it is desirable for the wheels not to lock during the braking and for the wheels to maintain a grip on the surface over which the vehicle is traveling; that is, the vehicle should not skid and should maintain static friction between the wheels and the travel surface. For this purpose, several methods and apparatuses for controlling braking force have been provided.

The conventional apparatus and methods for controlling the braking force uses the rotational speed of the wheel as an index or one of the indexes for judging the skidding of the wheel. However, the measurement of the rotational speed of the wheel is influenced by many local disturbances such as dips and bumps. The fluctuating error in the measured rotational speed of the wheel results in an error in the control of the braking force and lengthens the distance over which the vehicle runs before it comes to a complete stop.

SUMMARY OF THE INVENTION

In view of the above mentioned problems residing in the prior technology, the present invention is intended to provide an apparatus and a method for controlling a braking system which provides the most effective braking force without being influenced by measurement errors of the rotational speed of the wheel. According to the present invention, threshold values regarding slip speed and wheel acceleration, which are used as indices for judging the necessity of controlling the braking force, are altered with reference to the deviation of current slip speeds and acceleration from their thresholds. Throughout the present specification, the terms the wheel speed and the wheel acceleration are used to designate the speed obtained by multiplying the rotation of the wheel by its radius and its time derivative, respectively. The term slip speed is used to designate a difference between the actual running speed of the vehicle and the wheel speed of the vehicle. But because to measure the actual speed of the vehicle is practically difficult, when the wheels are skidding, a reference speed, which is calculated from the wheel speed according to a mathematical operation described in the detailed description, is used instead of the actual speed of the vehicle.

In an aspect of the present invention, there is provided an anti-skid brake control apparatus for a brake system of wheeled vehicles which comprises (a) a device which calculates at least one of a slip speed and a wheel acceleration, (b) a device which temporarily determines a threshold value for at least one of the slip speed and the wheel acceleration with reference to at least one of the slip speed and the wheel acceleration, and (c) a control unit which controls the braking force of the brake system with reference to at least one of a difference between the slip speed and the threshold value thereof, and a difference between the wheel acceleration and the threshold value thereof.

Because the threshold values are temporarily altered after events corresponding to measurement errors, control of brake force is not influenced by the measurement errors and the braking force is controled in a most effective manner. Other features and effects of the present invention will be made clear by the following description and the drawings.

DETAILED DESCRIPTION OF THE PREFERRED EMBODIMENTS

Figure 1:
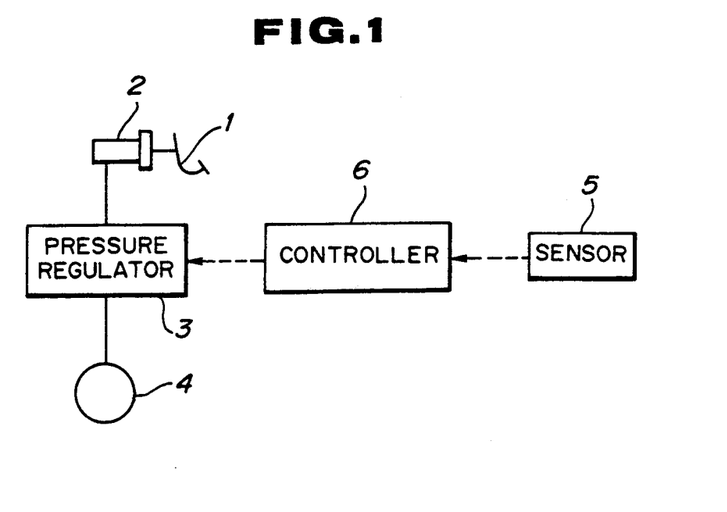
FIG. 1 is a schematic diagram of a braking system according to the present invention.

FIG. 1 shows schematically a braking system according to the present invention. The master cylinder 2 generates oil pressure in response to an operation of brake pedal 1. The magnitude of the oil pressure is altered by pressure regulator 3 and supplied to brake 4. The brake 4 exerts a braking force in response to the oil pressure. The controller 6 controls the oil pressure provided by regulator 3 according to the information provided by wheel speed sensor 5 and other conditions.

Figure 2:
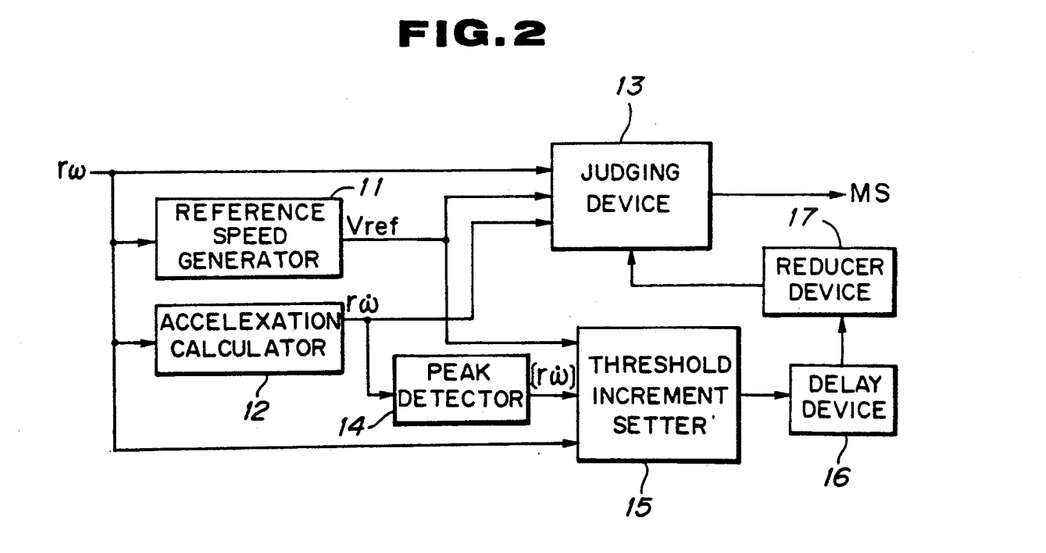
FIG. 2 is a block diagram showing the first embodiment of the present invention.

FIG. 2 shows controller 6 in more detail. Speed sensor 5 outputs a signal, for example, a pulse signal of which the number of pulses is proportional to the wheel speed. The pulse output signal of speed sensor is F/V converted, amplified, etc. and becomes a wheel speed signal denoted by $r\omega$ in the figure, and then the wheel speed signal is outputted to reference speed generator 11 and wheel acceleration calculator 12. The reference speed generator 11 generates a reference speed Vref which is an estimate of the actual speed of the vehicle for the given wheel speed $r\omega$ according to a predetermined mathematical operation. The mathematical operation is, for example, to use wheel speed $r\omega$ as reference speed Vref while the change rate of the wheel speed is within a predetermined range, to limit the highest change rate of the reference speed Vref to +2G when the wheel speed is increasing more rapidly than that value, and to limit the lowest change rate of the reference speed Vref to −1.2G when the wheel speed is decreasing more rapidly than that value. The acceleration calculator 12 calculates a time derivative $\dot{r\omega}$ of the wheel speed $r\omega$. The wheel speed $r\omega$, reference speed Vref and wheel acceleration $r\dot\omega$ is provided to the decision device 13 which determines whether to modify the oil pressure in light of the given data and controls the oil pressure when necessary.

The judgement whether to modify the oil pressure is made by the decision device according to the following procedure.

The first criterion is whether the difference between the reference speed Vref and the wheel speed $r\omega$ is equal to, or larger than, a predetermined threshold value S (referred to as slip threshold hereafter. The criterion is expressed mathematically as follows.

$$(Vref - r\omega) \geq S \qquad (1)$$

The second criterion is whether the wheel acceleration is lower than a second threshold $-b$, that is mathematically expressed as follows.

$$r\dot\omega \leq -b \qquad (2)$$

When one, or both, of the above two criteria is satisfied, an operation signal Ms is outputted to regulator 3 so as to decrease the oil pressure to be supplied to brake 4.

An acceleration signal $r\dot\omega$ is outputted by acceleration calculator 12 to peak detector 14. The peak detector 14 detects the peaks and transmits the peak value $[r\dot\omega]$ to threshold increment setter 15. The threshold increment setter 15 receives the peak value $[r\dot\omega]$, wheel speed $r\omega$ and reference speed Vref, and calculates the increment dS, db of the threshold values according to the procedure explained later. The increments dS and db are transmitted to decision device 13 via delay device 16 and reducer device 17. The decision device 13 renews the threshold values S and $-b$ with reference to the increments. The delay device 16 delays the transmission of the threshold increments to reducer device 17, and the reducer device 17 decreases the magnitude of the threshold increments according to the delayed time period and transmits the increments to decision device 13.

The procedure for determining the increment dS of the slip threshold S, in threshold increment setter 15, is described in more detail, as follows.

Figure 4:
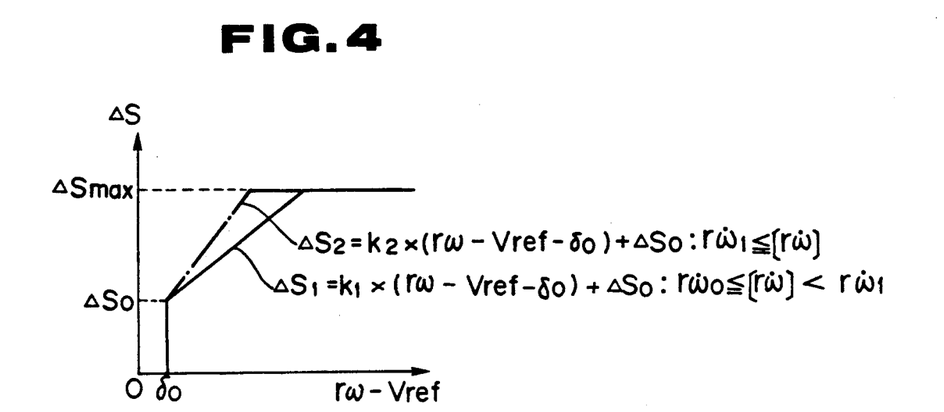
FIG. 4 is a diagram showing an example for the relation between the increment of the threshold value and the difference of the reference speed and the wheel speed.

As shown in FIG. 4, threshold increment setter 15 determines the increment of slip threshold increment dS with reference to the difference between the reference speed Vref and the wheel speed $r\omega$. When the difference $r\omega$-Vref is smaller than a predetermined value $d_0$, the increment is zero. When the difference $r\omega$-Vref is equal to or larger than the predetermined value $d_0$, the increments take the values described below according to a criteria regarding the peak wheel acceleration $[r\dot\omega]$.

$$dS_1 = k_1(r\omega - Vref - d_0) + dS_0 \cdot r\dot\omega_0 < [r\dot\omega] < r\dot\omega \qquad (3)$$

$$dS_2 = k_2(r\omega - Vref - d_0) + dS_0 \cdot r\dot\omega_1 < [r\dot\omega] \qquad (4)$$

When the peak wheel acceleration $[r\dot\omega]$ is equal to or larger than a predetermined value $r\dot\omega_0$ and smaller than a second predetermined value $r\dot\omega_1$, the equation (3) is applied. But, when the peak wheel acceleration $[r\dot\omega]$ is equal to or larger than the second predetermined value $r\dot\omega_1$, the equation (4) is applied. In both cases the slip increment does not exceed a predetermined maximum increment dSmax. Therefore, when the equations (3) and (4) yield an increment larger than the maximum value, the value is replaced by the maximum increment dSmax. The coefficients $k_1$ and $k_2$ are predetermined constant values. The predetermined values $r\dot\omega_0$, $r\dot\omega_1$, $d_0$ and $dS_0$ may be zero.

It is also possible to replace the equations (3) and (4) with the following equation (5) wherein the coefficient k is a linear function of wheel acceleration $r\dot\omega$.

$$ds = k(r\omega - Vref - d_0) + dS_0 \qquad (5)$$

$$k = f(r\dot\omega) = -1 * r\dot\omega + m \qquad (6)$$

wherein 1 and m are constants, and the operand * designates a multiplication.

Figure 5:
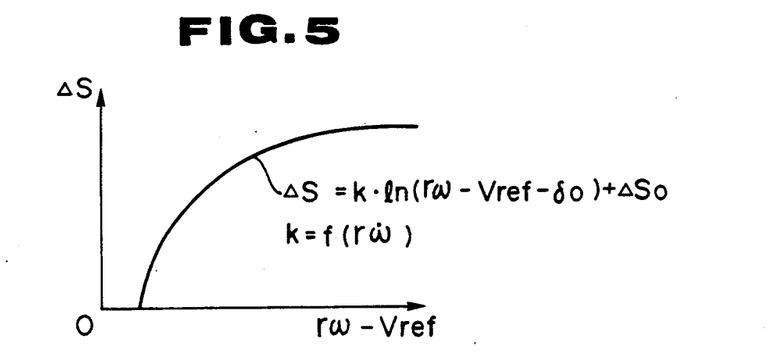
FIG. 5 is a diagram showing another example of the relationship between the increment of the threshold value and the difference of the reference speed and the wheel speed

FIG. 5 shows another criteria for determining the slip increment wherein the slip increment dS is a logarithmic function of the reference speed Vref and wheel speed $r\omega$. The coefficient k is a function of wheel acceleration. The relation is expressed as follows.

$$ds = k * \ln(r\omega - Vref - d_0) + dS_0 \qquad (7)$$

$$k = f(r\dot\omega) \qquad (8)$$

When the vehicle is passing over rough ground, for example, the rotational speed $r\omega$ may temporarily become more than $d_0$ larger than the reference speed Vref because of vibrations or release of the braking force and reacceleration. If the above case occurs, the wheel speed is higher than the actual speed or reference speed of the vehicle. Therefore, even if the difference between the reference speed and the wheel speed becomes larger than the first threshold value, or even if the wheel acceleration becomes lower than the first threshold value soon after the above event, this does not necessarily mean that the wheel is skidding. Instead the wheel which was rotating at a speed higher than the actual speed of the vehicle is being slowed down and coming to grip the ground. Therefore, the braking force acting on the brake should not be lessened in such a case. In order to avoid lessening of the braking force in such a circumstance, the slip threshold value is increased so as to be greater than the level usually encountered in this situation.

The operation of a brake control system according to an embodiment is described with reference to FIGS. 6 and 7. The example corresponds to braking on asphalt road having a relatively high friction coefficient u, in which vibrations caused by the drive mechanism tend to influence the braking force control. According to the example, the system utilizes two threshold values, the slip threshold value and the acceleration threshold value, and the decision device determines whether to increase or to decrease the threshold values with reference to the difference between the wheel speed and the reference speed.

Figure 6:
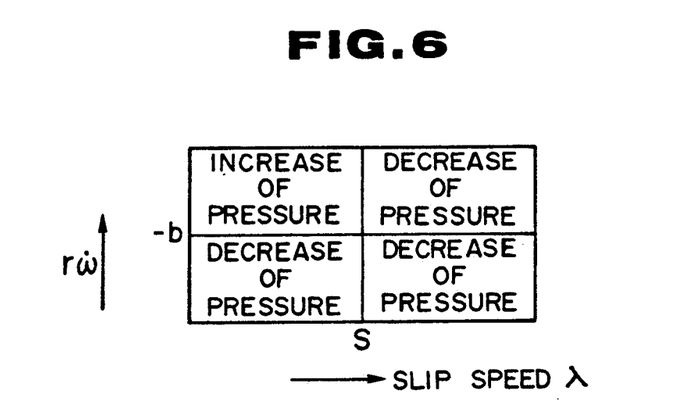
FIG. 6 shows a relation between the threshold values and the oil pressure control.

FIG. 6 shows how the oil pressure is controlled with reference to the threshold values. When the estimated braking slip magnitude, that is, the difference of reference speed and wheel speed Vref-$r\omega$ is larger than the slip threshold, the brake oil pressure is decreased no matter what level the wheel acceleration is. When the braking slip magnitude is lower than the slip threshold and the wheel acceleration $r\dot\omega$ is lower than the acceleration threshold, that is, when the wheel speed is decreasing at a rate higher than a predetermined value, the brake oil pressure is decreased. When the braking slip magnitude is lower than the slip threshold and the wheel acceleration is larger than the acceleration threshold, the brake oil pressure is increased.

Figure 7A:
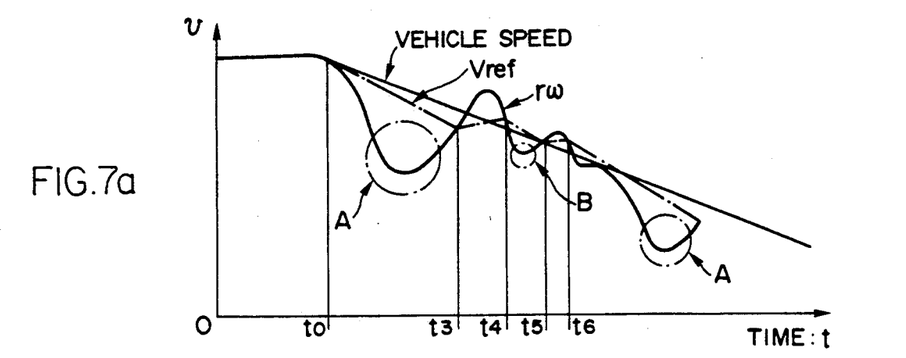
FIGS. 7a–7d show time series of the velocity, wheel acceleration, slip measurement and brake oil pressure according to one embodiment of the present invention.
Figures 7B, 7C:
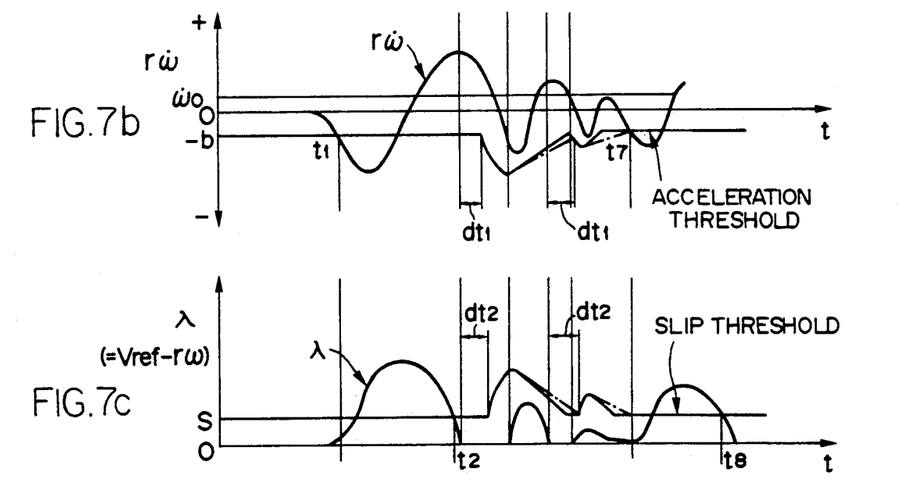

FIG. 7(a) shows the change over time of the actual vehicle speed, reference speed and wheel speed when a braking force is applied. The thick solid line represents the wheel speed of the wheel. The thin solid line represents the actual speed of the vehicle. The dotted line represents the reference speed. FIG. 7(b) shows the change over time of the wheel acceleration. The thick solid line in FIG. 7(b) designates the wheel acceleration and the thin solid line designates the acceleration threshold. FIG. 7(c) shows the difference between the reference speed and the wheel speed by the thick solid line, and the slip threshold S by a thin solid line. FIG. 7(d) shows the brake oil pressure.

During initial portions of the lines when the vehicle is running at a constant speed, the actual speed of the vehicle, the reference speed of the vehicle and the wheel speed are identical to one another, as shown in FIG. 7(a).

Figure 7D:
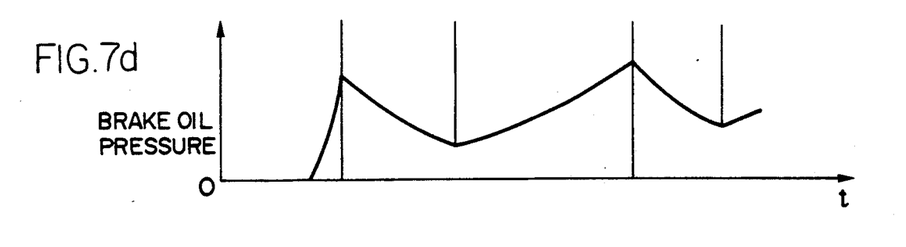

At time $t_0$, braking starts and the brake oil pressure increases as shown in FIG. 7(d). Simultaneously, the wheel speed $r\omega$, the reference speed and the actual vehicle speed diverge from one another. Soon after time $t_0$, the wheel speed $r\omega$ decreases more quickly than the other speeds showing that the wheels are skidding. At the same time the wheel acceleration shown in FIG. 7(b) becomes negative and continues to decrease. Because of the divergence of the reference speed Vref and the wheel speed $r\omega$ as shown in FIG. 7(a), the slip speed shown in FIG. 7(c) increases. During that time, the brake oil pressure continues to increase as shown in FIG. 7(d). Over the same period, the reference speed Vref decreases at a constant rate which is smaller than the decreasing rate of the wheel speed $r\omega$ because the change rate of the reference speed is controlled not to exceed a range of between $-1.2G$ and $2G$. In the region denoted by dotted circles A in FIG. 7(a), the wheel speed becomes far lower than the actual speed of the vehicle due to an excessive braking force.

At time $t_1$, the wheel acceleration surpasses the acceleration threshold and the control unit decreases the brake oil pressure. This is the condition shown as the left lower region in FIG. 6. Therefore, the brake oil pressure begins decreasing at time $t_1$. For a short time thereafter, the discrepancy between the reference speed Vref and the wheel speed is large, and even tends to initially further diverge.

Then at time $t_2$, the slip speed Vref-$r\omega$ becomes lower than the slip threshold S and the wheel acceleration becomes higher than the acceleration threshold $-b$, that is, the condition corresponds to the upper left region of FIG. 6. Consequently, the oil pressure is increased.

Soon after, the slip speed becomes not positive at time $t_3$ which corresponds to the fact that the wheels start sliding due to excessive driving force. The present situation corresponds to the condition depicted in equation (3) or (4) and FIG. 4. Therefore, threshold increment setter 15 determines to increase the threshold values. But, the actual increase of the acceleration threshold $-b$ is performed $dt_1$ after time $t_3$, and the slip threshold S is performed $dt_2$ after time $t_3$, due to the delay device 16 connected to the increment setter. After time $t_3$, the wheel speed is larger than the reference speed Vref.

At time $t_4$, the wheel speed coincides with the reference speed Vref and the slip speed becomes positive which means that the condition shown in equations (3) and (4) are no longer satisfied. Therefore, the threshold increment setting device stops outputting an increment and the threshold values start gradually returning to the initial values. The state designated by a dotted circle B in FIG. 7(a) is typically caused by vibrations in the drive mechanism wherein the wheel speed is lower than the reference speed and the actual speed of the vehicle. During the same period, the slip speed and the wheel acceleration surpass their respective initial thresholds. But, because the thresholds are altered, the condition remains in the upper left region in FIG. 6 and consequently the brake oil pressure continues to increase as shown in FIG. 7(d). The threshold values are decreased linearly after time $t_4$ in the example shown. But, they may be decreased in an exponential function as shown in the following equations.

$$db = dbmax*Exp(-c_1*t) \quad (9)$$

$$dS = dSmax*Exp(-c_2*t) \quad (10)$$

$c_1, c_2$:constants

By virtue of this operation, the brake oil pressure is not lowered unnecessarily even though the slip speed temporarily exceeds the initial slip threshold. Accordingly, lengthening of required brake distance due to an unexpected disturbance such as a vibration of the driving mechanism is avoided.

At time $t_5$, the slip speed again becomes negative and an increase of the threshold values is performed according to the procedure mentioned above. The difference is that the increments of the threshold values are smaller than those at time $t_3$ because the increment depends on the slip speed.

At time $t_7$, the wheel acceleration becomes lower than the acceleration threshold and the slip speed becomes lower than the slip threshold, that is, the condition enters in the lower left region in FIG. 6 and the brake oil pressure starts to decrease.

As has made clear by the above description, the present invention provides a system for controlling the braking system for further minimizing the braking distance by eliminating unnecessary decreases of the braking force which may be caused by roughness of the road, vibrations of the drive mechanism, etc.

The second preferred embodiment is described hereafter with reference to the attached drawings.

Figure 3:
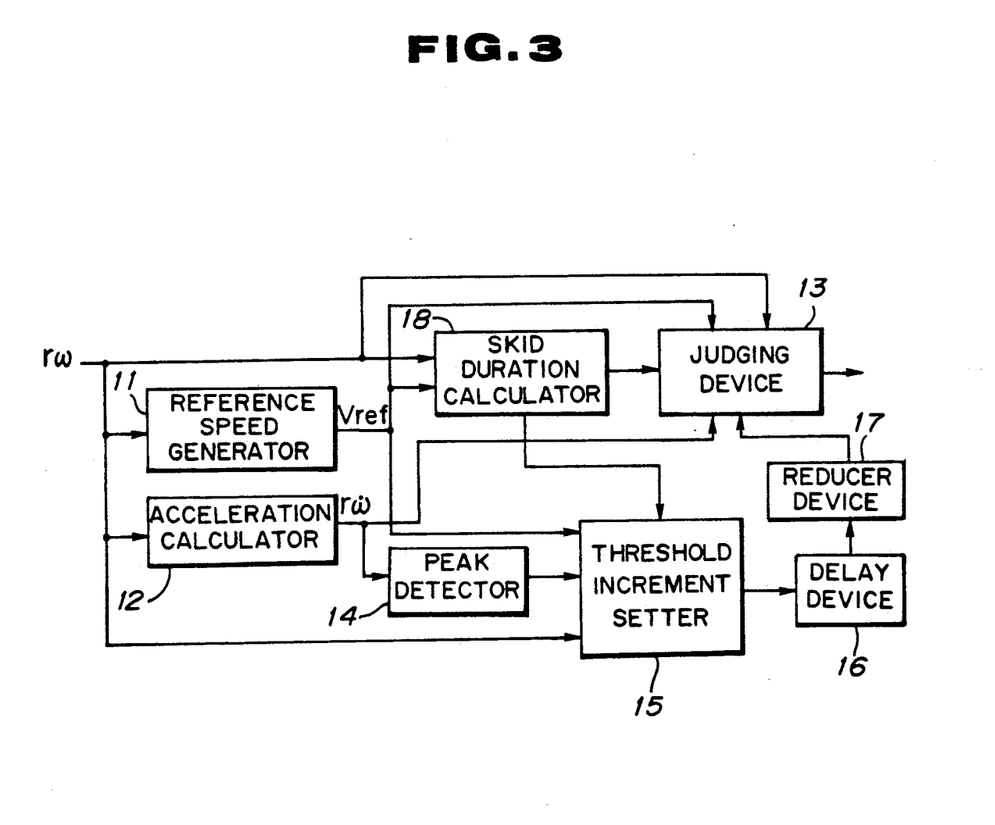
FIG. 3 is a block diagram showing the second embodiment of the present invention.

FIG. 3 is a block diagram showing the second preferred embodiment. It differs from the first preferred embodiment in that skid duration counter 18 is provided in controller 6. The skid duration counter 18 receives the reference speed Vref and the wheel acceleration $r\omega$, and provides threshold increment setter 15 with data regarding the skid duration. In addition to the procedure described regarding the first preferred embodiment, the skid duration is taken into account when threshold increment setter 15 alters the threshold values. More concretely, threshold increment setter 15 does not alter the threshold values when the skid duration is longer than a predetermined value $T_0$, even though all the other conditions are satisfied, for example. The simplest method is to maintain the predetermined value $T_0$ constant during the operation, but the value $T_0$ can be changed according to other factors related to driving conditions.

Figure 8A:
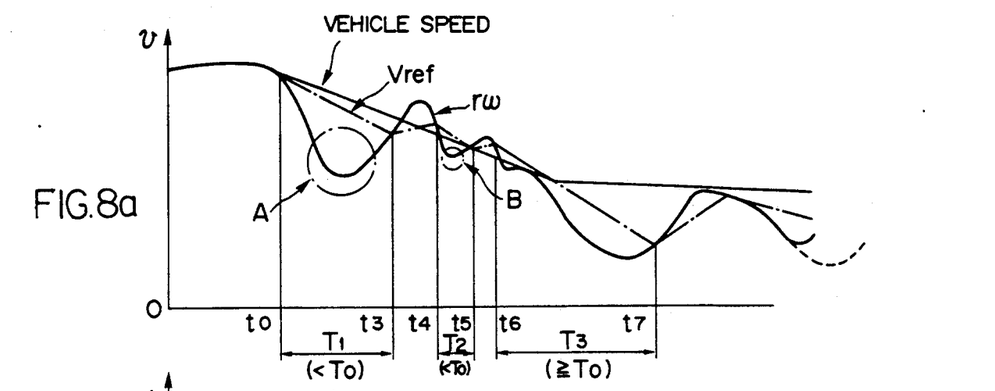
FIGS. 8a–8d show time series of the velocity, wheel acceleration, slip measurement and brake oil pressure according to another embodiment of the present invention.
Figure 8B:
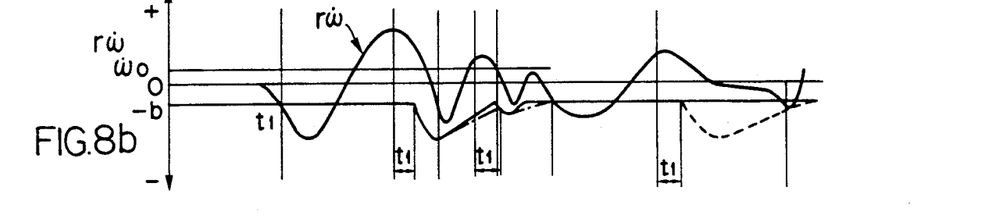
Figure 8C:
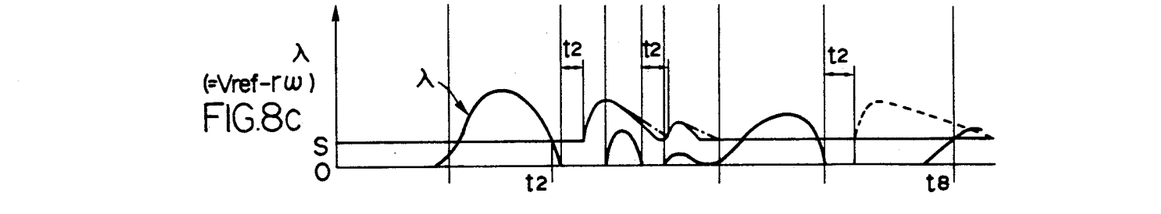
Figure 8D:
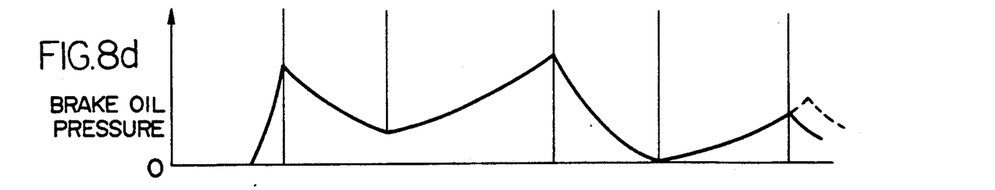

Operation of the skid control according to the second embodiment is described with reference to FIG. 8 as follows. Because the braking control up until time $t_7$ is identical to the first embodiment, the control is explained only briefly. Skidding first starts at time $t_0$. At time $t_3$, the wheel speed $r\omega$ exceeds the reference speed Vref, that is, the criteria to reset the threshold values as mentioned in the first embodiment are satisfied and the slip duration time $T_1$ is less than the slip duration threshold $T_0$, as shown in FIG. 8(a). Therefore, the threshold values are changed after slipping stop at time $t_3$. The skidding again starts at time $t_4$ and stops at time $t_5$. Because the slip duration $T_2$ is smaller than the slip time threshold $T_0$, here again, the threshold values are reset after the skidding stops at time $t_5$. Then, skidding occurs again at time $t_6$ and continues until $T_3$ which is larger than the slip time threshold $T_0$. Therefore, when the slipping stops at time $t_7$, resetting of the threshold values is prevented. In FIGS. 8(a), through 8(d), the dotted line designates the velocity, etc., according to the first preferred embodiment, and the solid lines designate the present embodiment. As a result of the present embodiment, in contrast with the first embodiment, the braking force does not increase after time $t_8$.

The control procedure according to the second embodiment is effective especially when the vehicle is running on slippery ground such as on snow covered roads. Under such conditions, the wheels tend to continue slipping and application of excessive braking force should be carefully avoided.

In the above embodiments, both the slip threshold and the acceleration threshold are utilized in the control, but one of them alone may be a sufficient criterion for the control. The slip threshold and the acceleration threshold are both altered according to driving conditions, but one of them alone may be altered according to the driving conditions even when both of them are used as control parameters in the system. The electronic structure of the system may be composed of analog electronic circuits or digital circuits. Instead of making the decision as to whether to increase or decrease the brake oil pressure, a decision may be made so as to increase, maintain or decrease the brake oil pressure. Instead of using the slip speed as a parameter to determine the increment of the threshold values, other parameters such as wheel acceleration may be used for the same purpose.

What is claimed is:

1. An anti-skid brake control apparatus for a brake system for wheeled vehicles, the apparatus comprising:
   (a) a speedometer for measuring rotational speed of at least one wheel;
   (b) a first calculation means for calculating a reference speed of the vehicle, the reference speed being an estimate of actual speed of the vehicle;
   (c) a second calculation means for calculating a slip speed and optionally a wheel acceleration, such that the slip speed is a differential speed between the reference speed and the rotational speed of the wheel, and such that the wheel acceleration is a time derivative of the rotational speed of the wheel;
   (d) a threshold value setting means for determining and altering threshold values for at least one of the slip speed and the wheel acceleration, according to the slip speed, wherein the alteration of the threshold values is performed at a predetermined time delay after determining new threshold values;
   (e) a comparison means for comparing at least one of the slip speed and the wheel acceleration calculated by the second calculation means with respective threshold values; and
   (f) a control means for controlling braking force of the brake system by means of varying brake fluid pressure in response to the comparison made by the comparison means.

2. An anti-skid brake control apparatus according to claim 1 wherein the first calculation means uses the rotational speed of the wheel as the reference speed while the slip speed is smaller than a predetermined value, and alters the reference speed at a predetermined rate when the slip speed exceeds the predetermined value.

3. An anti-skid brake control apparatus according to claim 1 wherein the second calculation means calculates the slip speed and the wheel acceleration, the threshold value setting means determines and alters the threshold value of the slip speed and the threshold value for the wheel acceleration, the comparison means compares the slip speed and the wheel acceleration calculated by the second calculation means with respective threshold values, and the control means controls the braking force in response to the comparison made by the comparison means.

4. An anti-skid brake control apparatus according to claim 1 wherein increments of threshold values are modified with reference to the time delay.

5. An anti-skid brake control apparatus according to clam 1 wherein the alteration of the threshold values is prevented in the condition that the slip speed exceeds the threshold value thereof during a time period longer than a predetermined slip time threshold.

6. A method for controlling a brake system of wheeled vehicles comprising the steps of:
   (a) measuring rotational speed of at least one wheel;
   (b) calculating a reference speed of the vehicle, the reference speed being an estimate of actual speed of the vehicle;
   (c) calculating a slip speed and optionally a wheel acceleration, such that the slip speed is a differential speed between the reference speed and the rotational speed of the wheel, and such tat the wheel acceleration is a time derivative of the rotational speed of the wheel;
   (d) determining and altering threshold values for at least one of the slip speed and the wheel acceleration, according to the slip speed, wherein alteration of threshold values is performed at a predetermined time delay after determining new threshold values;
   (e) comparing at least one of the slip speed and the wheel acceleration calculated in step (c) with respective threshold values determined in step (d); and
   (f) controlling braking force of the brake system by means of varying brake fluid pressure in response to the comparison made in step (e).

7. A method for controlling a brake system according to claim 6 wherein the reference speed is determined to be identical to the rotational speed while the slip speed is smaller than a predetermined value, and the reference speed is altered at a predetermined rate in the condition that the slip speed exceeds the predetermined value.

8. A method for controlling a brake system according to claim 6 wherein the slip speed and the wheel acceleration are calculated, the threshold value for the slip speed and the threshold value for the wheel acceleration are calculated, the calculated values are compared with determined threshold values, and the braking force is controlled in response to the comparison with the threshold values.

9. A method for controlling a brake system according to claim 6 wherein increments of threshold values are modified with reference to the time delay.

10. A method for controlling a brake system according to claim 6 wherein the alteration of the threshold values is prevented in the condition that the slip speed exceeds the threshold value thereof during a time period longer than a predetermined slip time threshold.

* * * * *

UNITED STATES PATENT AND TRADEMARK OFFICE
CERTIFICATE OF CORRECTION

PATENT NO. : 5,117,361
DATED : May 26, 1992
INVENTOR(S) : Toshio Takayama, et al.

It is certified that error appears in the above-identified patent and that said Letters Patent is hereby corrected as shown below:

Column 3, line 13: "$\geqq S$" should read as --$\geqq S$--

Column 3, line 20: "$\leqq -b$" should read as --$\leqq -b$--

Column 8, line 42, Claim 6: "tat" should read as --that--

Signed and Sealed this

Twenty-fourth Day of August, 1993

Attest:

BRUCE LEHMAN

Attesting Officer     Commissioner of Patents and Trademarks